July 16, 1946. W. T. WHITE 2,404,011
PREDICTION APPARATUS
Filed June 21, 1943

INVENTOR
WALTER T. WHITE
BY Herbert H. Thompson
HIS ATTORNEY.

Patented July 16, 1946

2,404,011

UNITED STATES PATENT OFFICE 2,404,011

PREDICTION APPARATUS

Walter T. White, Hempstead, N. Y., assignor to Sperry Gyroscope Company, Inc., a corporation of New York Application June 21, 1943, Serial No. 491,637

5 Claims. (Cl. 235—61.5)

This invention relates generally to the art of gun fire control and, more particularly, to novel prediction apparatus which combines the simplicity of previously known approximate prediction solutions with the accuracy of previously known true prediction solutions.

One object of the invention is to provide simple and accurate prediction apparatus for gun fire control.

Another object of the invention is to provide prediction apparatus which is comparable in simplicity to an "angular rate by time" system but having a greater accuracy.

Still another object of the invention is to provide a prediction system comparable in simplicity to an "angular rate by time" system but having an accuracy comparable to more complicated systems such as those based on Taylor's series.

An object of the invention is to provide prediction apparatus which takes account not only of the angular rate of change of a target coordinate, but also the time rate of change of that rate during the time of flight of the projectile.

A further object of the invention is to provide an "angular rate by time" prediction system wherein the angular rate is corrected by a factor proportional to the time rate of change of the angular rate and also to the average value of the time of flight likely to be encountered in practice.

A still further object of the invention is to provide simple prediction apparatus which takes into account the acceleration of the target position coordinate during the projectile time of flight.

Other objects and advantages will become apparent from the specification, taken in connection with the accompanying drawing wherein the invention is embodied in concrete form.

In the drawing.

Similar characters of reference are used in all of the above figures to indicate corresponding parts. Arrows are used to indicate the direction of flow of information or control influences.

In all known fire control systems the position of the target in space is continuously located in terms of two angular coordinates and one distance or range coordinate, such as by an optical sight and rangefinder. The two angular coordinates are usually elevation and azimuth, and since these are identically treated, at least insofar as the prediction problem is concerned, a general angular coordinate ($\theta$) will hereinafter be referred to. The prediction component of the whole fire control solution involves determining the prediction angle ($\Delta\theta$) by which the guns must be offset from the line of sight to the target in order to compensate for the motion of the target during the projectile time of flight ($t_p$).

The simplest and most approximate type of prediction solution is commonly known as the "angular rate multiplied by time" solution. This solution finds its greatest application in inter-aircraft and short range anti-aircraft fire control systems wherein a certain amount of accuracy in the solution may be sacrificed for simplicity of equipment and rapidity in the solution.

In such "angular rate by time" prediction systems, data corresponding to the angular coordinate ($\theta$) is continuously supplied to the prediction apparatus from the sight. This angular coordinate data is differentiated to obtain data corresponding to the time rate of change of the angular coordinate, hereafter referred to as the angular rate $$\left(\frac{d\theta}{dt}\right)$$

This angular rate data is then multiplied by the projectile time of flight ($t_p$), and the resulting product is taken as the required prediction angle ($\Delta\theta$). Thus the solution is based on the following approximation for the prediction angle:

$$\Delta\theta = \frac{d\theta}{dt} \cdot t_p$$

Figure 3:
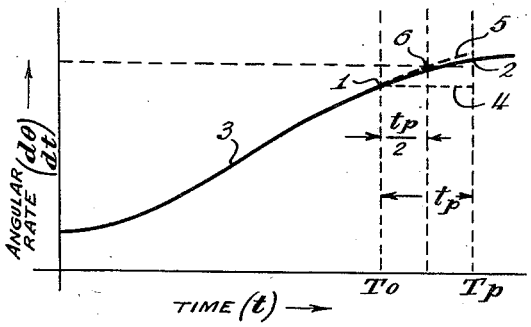
Fig. 3 is a graph useful in explaining the theory of the prediction solution employed in the invention.

Referring now to Fig. 3, the solid line 3 represents a portion of a typical curve which might be obtained by plotting the angular rate $$\left(\frac{d\theta}{dt}\right)$$

as a function of time ($t$) for a particular target. Point 1 indicates the angular rate at the time ($T_0$) at which the projectile leaves the gun, and point 2 the angular rate at the time ($T_p$) at which the projectile strikes the target.

In the simple "angular rate by time" solution the assumption is made that the angular rate is constant during the time of flight ($t_p$). In other words it is assumed that curve 3 follows the dotted line 4 from the time ($T_0$) to the time ($T_p$).

In practice this assumption is rarely, if ever, valid since in order to create such a condition the target would have to fly at a constant speed in a circle having the sight as its center. The solution for the prediction angle $(\Delta\theta)$, is in error then because no account has been taken of the change of the angular rate during the time of flight.

In order to obtain an accurate solution for the prediction angle $(\Delta\theta)$, such as is required for long range antiaircraft fire control systems, it has been proposed to make no assumptions at all concerning the motion of the target, but to compute the true prediction angle $(\Delta\theta)$ based upon the true mode of motion of the target in accordance with the following expression based on Taylor's series:

$$\Delta\theta = \frac{d\theta}{dt}\cdot t_p + \tfrac{1}{2}\frac{d^2\theta}{dt^2}(t_p)^2 + \tfrac{1}{6}\frac{d^3\theta}{dt^3}(t_p)^3 + \ldots + \frac{1}{n!}\frac{d^n\theta}{dt^n}(t_p)^n$$

$$= \left[\frac{d\theta}{dt} + \tfrac{1}{2}\frac{d^2\theta}{dt^2}\cdot t_p + \tfrac{1}{6}\frac{d^3\theta}{dt^3}(t_p)^2 + \ldots + \frac{1}{n!}\frac{d^n\theta}{dt^n}(t_p)^{n-1}\right]t_p$$

Correlating the above equation with Fig. 3, it will be seen that such a solution amounts to obtaining the true average value of the angular rate during the time of flight, and multiplying this average angular rate by the time of flight in order to obtain the true prediction angle $(\Delta\theta)$. However, in order to accomplish such a solution it is necessary to take not only the first derivative $$\left(\frac{d\theta}{dt}\right)$$

of the angular coordinate $(\theta)$, but also the second derivative $$\left(\frac{d^2\theta}{dt^2}\right)$$

and the third derivative $$\left(\frac{d^3\theta}{dt^3}\right)$$

and so on. These respective derivatives must then be multiplied by the corresponding powers of the time of flight, and the respective resulting products must be added together to obtain the prediction angle $(\Delta\theta)$. Such a prediction system, although it would provide a very accurate solution for the prediction angle, would take a long time to accomplish the solution, and would involve considerable complication of equipment because of the necessity of solving for the higher derivatives, the higher powers of time of flight, and the respective product terms of the series.

In the above described system based on Taylor series, the successive terms of the series introduce successively smaller components of the true prediction angle $(\Delta\theta)$. Accordingly the process can be stopped whenever the desired degree of accuracy has been attained. Indeed, the simple "angular rate multiplied by time" system first described may be considered as an approximation based upon Taylor series in which only the first product $$\left(\frac{d\theta}{dt}\cdot t_p\right)$$

is used and all subsequent products are considered negligible.

A better approximation for the prediction angle $(\Delta\theta)$ than that obtained in an "angular rate by time" system could be realized by using the first two terms of Taylor's series, the approximation then being:

$$\Delta\theta = \frac{d\theta}{dt}\cdot t_p + \tfrac{1}{2}\frac{d^2\theta}{dt^2}(t_p)^2 = \left[\frac{d\theta}{dt} + \tfrac{1}{2}t_p\cdot\frac{d^2\theta}{dt^2}\right]t_p$$

Referring to Fig. 3, such a solution is equivalent to assuming that the average value of the angular rate is at point 6 on dotted line 5 which value may be obtained by taking the angular rate at the time $(T_0)$ and adding thereto the product of one-half the time of flight $(t_p)$ and the time rate of change of the angular rate at the time $(T_0)$. In other words, it is assumed that the angular acceleration is constant during the time of flight and that curve 3 therefore travels along the dotted line 5 which is tangent to curve 3 at point 1. Obviously, such an assumption is more valid than the assumption of a constant angular rate, and a more accurate solution for the prediction angle will be obtained than in an "angular rate by time" system. However, even this solution is more or less complicated since it is necessary to obtain the first and second derivatives, the first and second powers of time of flight, and to perform two multiplications.

In the present invention, it is proposed to obtain an approximate value for the average angular rate by adding to the angular rate at time $(T_0)$ a correction proportional to the angular acceleration $$\left(\frac{d^2\theta}{dt^2}\right)$$

Thus, the expression for the prediction angle $(\Delta\theta)$ as solved for in the present apparatus may be written:

$$\Delta\theta = \left(\frac{d\theta}{dt} + K\frac{d^2\theta}{dt^2}\right)t_p = \frac{d\theta}{dt}\cdot t_p + K\frac{d^2\theta}{dt^2}\cdot t_p$$

The value of K is chosen so as to be equal to one-half of the average values of all the time of flight likely to be encountered, that is $K = \tfrac{1}{2}t_p$ (average). In many applications the time of flight varies within rather small limits and therefore the predetermined value of K may be a good approximation to $\tfrac{1}{2}t_p$. Accordingly, the solution for the prediction angle will be more accurate than that of a simple "angular rate by time" solution, and will approach the accuracy obtained by taking the first two terms of Taylor's series. However, by making K equal to $\tfrac{1}{2}t_p$ (average) one multiplication by time of flight is eliminated in the prediction apparatus. Accordingly by the present invention a certain degree of accuracy is obtained with the minimum complication, and in cases where just this degree of accuracy is required the apparatus of the present invention may be found very useful.

Figure 1:
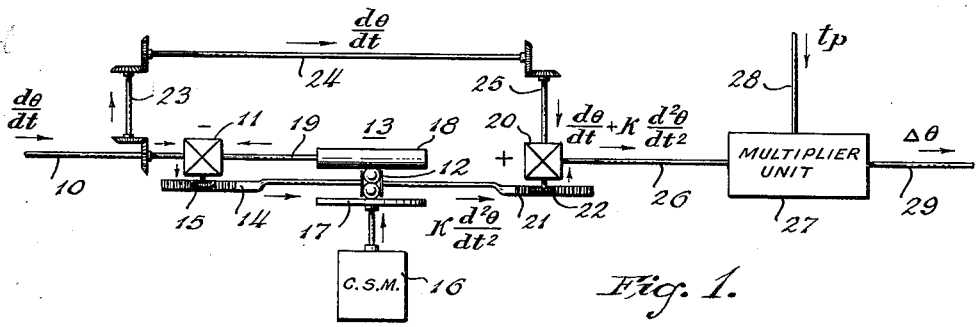
Fig. 1 is a schematic diagram of mechanical apparatus embodying the principles of the invention.

Referring now to Fig. 1 wherein mechanical apparatus for solving for the prediction angle $(\Delta\theta)$ based upon the above analysis is shown, data corresponding to the angular rate $$\frac{d\theta}{dt}$$

is received as a proportional rotation of input shaft 10 from other portions of the fire control system (not shown). Shaft 10 is connected to actuate one input member of a differential 11, the output member of which is connected to actuate the ball carriage 12 of a variable speed device 13, as by rack 14 and pinion 15. The variable speed device is shown as the usual disc ball carriage, and cylinder type wherein a constant speed motor 16 drives a disc 17, which in turn drives a cylinder 18 through the interconnecting ball carriage 12 at a rate proportional to the speed of the motor 16 and to the displacement of the ball carriage 12 from its central position with respect to disc 17. Cylinder 18 is connected by shaft 19 to drive the second input member of differential 11 which operates to displace the pinion 15 an amount proportional to the difference in the displacements of shafts 10 and 19.

As it well known, this arrangement of variable speed device 13 and differential 11 operates to attain a condition of equilibrium at which the rates of rotation of shafts 10 and 19 are equal. When this condition has been reached, the displacement of ball carriage 12 is proportional to the time rate of change of the angular displacement of shaft 10, and is therefore proportional to the acceleration or second derivative $$\left(\frac{d^2\theta}{dt^2}\right)$$

of the angular coordinate ($\theta$). This can be seen by a consideration of the fact that should shafts 10 and 19 not be rotating at the same rate, the third member of differential 11 will be additionally displaced, causing a corresponding displacement of ball carriage 12 in such a direction as to increase or decrease the angular rate of shaft 19 until it does equal that of shaft 10. Since the rate of rotation of shaft 19 is proportional to the displacement of ball carriage 12 because of the nature of operation of variable speed device 13, the displacement of ball carriage 12 may be taken as proportional to the time rate of change of the angular displacement of shaft 10, and therefore proportional to the time rate of change $$\left(\frac{d^2\theta}{dt^2}\right)$$

of the angular rate $$\left(\frac{d\theta}{dt}\right)$$

This second derivative, appearing as a proportional displacement of ball carriage 12, is introduced as a proportional displacement of one input member of differential 20, as by rack 21 and pinion 22. A second input member of differential 20 is displaced by an amount proportional to the angular rate $$\left(\frac{d\theta}{dt}\right)$$

by being directly actuated from shaft 10 through shafts 23, 24, and 25, and the associated gearing. Differential 20 operates to angularly displace its output shaft 26 by an amount proportional to the sum of the angular displacements of its two input shafts. Accordingly, output shaft 26 is angularly displaced by an amount proportional to the quantity $$\left(\frac{d\theta}{dt}+K\frac{d^2\theta}{dt^2}\right)$$

The angular displacement of shaft 26 is introduced into a mechanical multiplier unit 27, into which there is also introduced the time of flight ($t_p$) as an angular displacement of shaft 28 from other portions of the fire control system. The multiplier unit 27 may be of the type disclosed in U. S. Patent No. 2,194,477 for a Multiplying machine, issued in the names of W. L. Maxson and P. J. McLaren, dated March 26, 1940. As disclosed in that patent, the multiplier unit is adapted to produce an angular displacement of an output shaft equal to the product of the angular displacements of two input shafts. Accordingly, output shaft 29 will be displaced by an amount equal to the product of the time of flight ($t_p$) and the quantity $$\left(\frac{d\theta}{dt}+K\frac{d^2\theta}{dt^2}\right)$$

and will therefore be displaced by an amount proportional to the prediction angle ($\Delta\theta$) in accordance with the above derived equation:

$$\Delta\theta=\left(\frac{d\theta}{dt}+K\frac{d^2\theta}{dt^2}\right)t_p$$

In the apparatus of Fig. 1 the value of K may be made equal to one-half the average time of flight, as is required, by choosing the proper speed of motor 16 and proper values of the various gear ratios involved.

Figure 2:
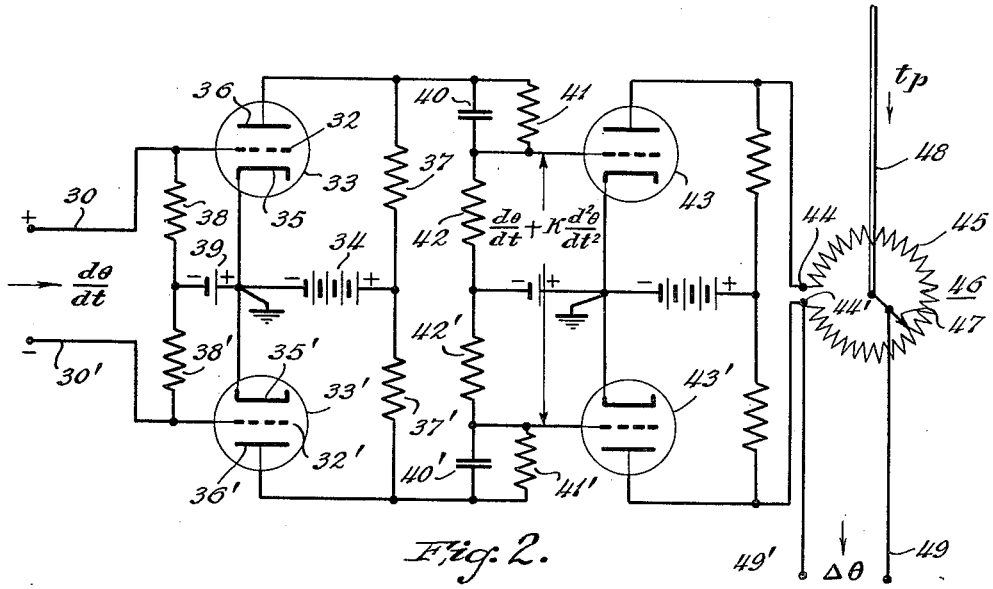
Fig. 2 is a wiring diagram of the analogous electrical apparatus embodying the principles of the invention.

Referring now to Fig. 2, wherein an electrical embodiment of the invention is shown, it is assumed that a direct voltage signal corresponding in polarity and magnitude to the angular rate $$\left(\frac{d\theta}{dt}\right)$$

has been generated in other portions of the fire control system and is applied across input leads 30, 30'. These input leads are respectively connected to the grids 32, 32' of electron tubes 33, 33'. A plate supply voltage, indicated as a battery 34, is connected at its negative end, which may be grounded, as shown, to cathodes 35, 35' and at its positive end to the plates 36, 36' through equal resistors 37, 37'. A grid bias voltage is provided, indicated as battery 39, having its positive side connected to cathodes 35, 35' and its negative side connected to grids 32, 32' through equal resistors 38, 38'.

The electric circuit so far described is simply an amplifying circuit adapted to produce across the opposing terminals of the series circuit consisting of resistors 37, 37' a voltage of the opposite polarity to that appearing across input leads 30, 30', and having a proportional but greater magnitude. If it is assumed that zero signal voltage is received across leads 30, 30', it will be apparent that equal plate currents flow in tubes 33, 33' and thence through resistors 37, 37' in opposite directions. Accordingly, the total voltage across the series circuit consisting of these two resistors would be zero. However, should an input voltage signal be received of a polarity such that lead 30 is positive with respect to lead 30', the grid of tube 33 will be rendered more positive and the grid of tube 33' will be rendered less positive than their quiescent values. Accordingly, more current will flow through resistor 37 than through resistor 37', and the potential of the upper terminal of resistor 37 will become more negative than the potential of the lower terminal of resistor 37'. A resulting voltage will thus be produced across the opposing terminals of resistors 37, 37' having a polarity opposite to that of the input voltage signal received across leads 30, 30', and an amplified magnitude. In the same manner, should an input signal be received having opposite polarity to that just assumed such that lead 30' is positive with respect to lead 30, an opposite polarity voltage would be produced across resistors 37, 37' such that the lower terminal of resistor 37' is negative with respect to the upper terminal of resistor 37 by a proportional amount. Thus the voltage across resistors 37, 37', corresponding to the input voltage across leads 30, 30', is proportional in magnitude and opposite in polarity to the magnitude and sense of the angular rate $$\left(\frac{d\theta}{dt}\right)$$

This voltage is applied across a series network consisting of condenser 40 and resistor 41 connected in parallel, resistor 42, resistor 42', and the condenser 40' and resistor 41' connected in parallel. Neglecting for the moment the effect of condensers 40, 40', it will be apparent that resistors 41, 41', 42, 42' comprise a simple voltage divider network so that a voltage will be developed across the opposite terminals of resistors 42, 42', proportional in magnitude to that across resistors 37, 37', and therefore also proportional in magnitude to the angular rate $$\left(\frac{d\theta}{dt}\right)$$

Considering now the effect of condensers 40, 40' upon the current through the resistors 42, 42' it will be seen that an additional component of current will flow through these resistors whenever the voltage across resistors 37, 37' is changing. If condenser 40, 40' and resistors 42, 42' are chosen such that the time constant of their series circuit is small, this added component of current will be proportional in magnitude to the time rate of change of the voltage across resistors 37, 37' and will therefore be proportional in magnitude to the second time derivative $$\left(\frac{d^2\theta}{dt^2}\right)$$

of the angular coordinate ($\theta$). Accordingly, the total voltage across the grids of tubes 43 and 43' is proportional in magnitude to the quantity $$\left(\frac{d\theta}{dt} + K\frac{d^2\theta}{dt^2}\right)$$

The values of resistors 41, 41', 42, 42' and condensers 40, 40' in this case also are chosen so that $K$ will have a value equal to one-half the average time of flight. These values can be determined in any suitable manner. For example, the relation between the input ($e$) to tubes 36 and 36' and the voltage before grids of tubes 43 and 43' ($E_g$) can be chosen to be $$E_g = \mu\frac{R_{42}}{R_{41}}[1 + pR_{42}C_{40}]e$$

where $p$ is the differential operator $$\frac{d}{dt}$$

$\mu$ is the amplification factor of each of tubes 36 and 36', and the resistances R, and the condensers C are identified by subscripts corresponding to the reference characters used in Fig. 2.

Substitution of $$\frac{d}{dt}$$

for $p$ and $$\frac{d\theta}{dt}$$

for $e$ gives $$E_g = \mu\frac{R_{42}}{R_{41}}\left[\frac{d\theta}{dt} + R_{42}C_{40}\frac{d^2\theta}{dt^2}\right]$$

Now $$\frac{R_{41}}{R_{42}}$$

can be adjusted to equal $\mu$; so that $$E_g = \left[\frac{d\theta}{dt} + R_{42}C_{40}\frac{d^2\theta}{dt^2}\right]$$

Then, if we let $K = R_{42}C_{40}$, $$E_g = \frac{d\theta}{dt} + K\frac{d^2\theta}{dt^2}$$

The first of the above equations for $E_g$ results from some simplifying approximations. It becomes more and more accurate, the greater the value of $\mu$, provided $$\frac{R_{41}}{R_{42}} = \mu$$

and the accuracy is quite satisfactory for fire control applications.

This voltage is then applied to the grids of electron tubes 43, 43' which, in conjunction with their associated circuit elements, form an amplifying circuit having exactly the same operation as the amplifying circuit described with respect to electron tubes 33, 33'. This latter amplifying circuit therefore operates to produce an output voltage across terminals 44, 44' having a polarity opposite to that across resistors 42, 42', and having an amplified magnitude. There is thus produced across the output terminals 44, 44' of this amplifying circuit a voltage having an amplitude proportional to and polarity corresponding to the magnitude and sense of the quantity $$\left(\frac{d\theta}{dt} + K\frac{d^2\theta}{dt^2}\right)$$

This voltage is then applied across the terminals of the linearly wound resistor 45 of potentiometer unit 46 which has a movable contact arm 47 actuated in accordance with time of flight ($t_p$) received as a proportional rotation of shaft 48 from other portions of the fire control system. The final voltage generated across output leads 49, 49' will be proportional to the voltage impressed upon the resistor 45 and also proportional to the angular displacement of shaft 48. Therefore, the voltage across output leads 49, 49' will be proportional in a magnitude and will correspond in polarity to the magnitude and sense of the quantity $$\left(\frac{d\theta}{dt} + K\frac{d^2\theta}{dt^2}\right)t_p$$

and will therefore correspond to the prediction angle ($\Delta\theta$).

It will be apparent that should the received signal corresponding to the angular rate $$\left(\frac{d\theta}{dt}\right)$$

be represented by the amplitude and phase of an alternating voltage rather than the magnitude and polarity of a direct voltage, as has been assumed, suitable alternating current amplifying and differentiating circuits could be substituted for those shown in Fig. 2 to produce an alternating current output signal corresponding to the prediction angle ($\Delta\theta$).

Although the invention has been described as applied to a fire control system wherein the prediction is accomplished in terms of spherical coordinates, it will be apparent that a linear coordinate ($x$) of the target's position could as well be substituted for the angular coordinate ($\theta$) with equally advantageous results in computing a linear prediction ($\Delta x$).

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a fire control system, wherein a measure of the time rate of change of a coordinate of the target position is received as the magnitude of a first variable voltage, and a measure of the projectile time of flight is received as an angular displacement of a shaft, prediction apparatus comprising an electrical network receiving said first voltage and consisting of a first resistor connected in series with a parallel arrangement of a second resistor and a condenser, a potentiometer unit having a linearly wound resistive winding connected to receive the voltage across said first resistor, and a rotating contact arm cooperating with the potentiometer winding actuated from said shaft.

2. A fire control system having an apparatus for computing close approximations of prediction angles, comprising means controlled according to the variable angular rate of a target, other means for further controlling said means to add to said angular rate a linear correction to obtain an approximate value for the average angular rate of the target, said correction being the product of a derivative of said angular rate and a constant, a multiplying device for multiplying by a time of flight value, means for actuating said multiplying device in accordance with said approximate average angular rate whereby a product is obtained from the multiplying device which closely approximates the required prediction angle.

3. A fire control system having an apparatus for computing close approximations of prediction angles, comprising means controlled according to the variable angular rate of a target, other means for further controlling said means to add to said rate a correction to obtain an approximate value for the average angular rate of the target, said correction being the product of a derivative of said angular rate and a constant, said constant being equal to one half of the average time of flight of the projectile, a multiplying device, means for operating said device with a time of flight value as a multiplier and said value of average angular rate as a multiplicand whereby a product is obtained from the multiplying device which is closely proportional to the required prediction angle.

4. A fire control system having means for computing prediction angles, comprising an amplifier, an input circuit therefor energized by a voltage proportional to the angular rate of the target, circuit means in the amplifier for computing a correction voltage and adding said correction voltage to the angular rate voltage to obtain a voltage approximately proportional to the average angular rate of the target, said correction voltage being a first derivative of the angular rate multiplied by a constant equal to one-half of an average time of flight value, multiplying means connected to the output of the amplifier adapted to multiply the average angular rate voltage by a time of flight factor whereby a voltage is produced at the output of the multiplying means proportional to the required prediction angle.

5. A fire control system having means for computing prediction angles, comprising an amplifier, an input circuit therefor energized by a voltage proportional to the angular rate of the target, circuit means in the amplifier comprising a resistor and condenser network for producing a voltage proportional in magnitude to the first derivative of the angular rate of the target multiplied by a constant, the network components being so chosen that the constant is equal to one-half of the average time of flight, means in the network for adding this voltage to an amplified voltage proportional to the input voltage to produce a voltage proportional to the approximate average angular rate of the target, and means for multiplying the average angular rate voltage by a factor proportional to time of flight in order to obtain a voltage proportional to the required prediction angle.

WALTER T. WHITE.